US012583352B2

(12) United States Patent
Shahriar et al.

(10) Patent No.: US 12,583,352 B2
(45) Date of Patent: Mar. 24, 2026

(54) DELIVERY OF STORED ELECTRICAL ENERGY FROM GENERATION SOURCES TO NANO-GRID SYSTEMS

(71) Applicant: Adaptr, Inc., Toronto (CA)

(72) Inventors: Hassan Shahriar, Toronto (CA);
Amgad El-Deib, Toronto (CA)

(73) Assignee: Adaptr, Inc., Toronto (CA)

( * ) Notice: Subject to any disclaimer, the term of this patent is extended or adjusted under 35 U.S.C. 154(b) by 896 days.

(21) Appl. No.: 17/793,300

(22) PCT Filed: Jan. 21, 2021

(86) PCT No.: PCT/CA2021/050061
§ 371 (c)(1),
(2) Date: Jul. 15, 2022

(87) PCT Pub. No.: WO2021/146806
PCT Pub. Date: Jul. 29, 2021

(65) Prior Publication Data
US 2023/0347778 A1 Nov. 2, 2023

Related U.S. Application Data

(60) Provisional application No. 62/963,841, filed on Jan. 21, 2020.

(51) Int. Cl.
| | |
|---|---|
| *B60L 53/66* | (2019.01) |
| *B60L 55/00* | (2019.01) |
| *H02J 3/32* | (2006.01) |
| *H02J 3/38* | (2006.01) |

(52) U.S. Cl.
CPC .............. *B60L 53/66* (2019.02); *B60L 55/00* (2019.02); *H02J 3/322* (2020.01); *H02J 3/381* (2013.01)

(58) Field of Classification Search
CPC ................................. B60L 55/00; B60L 53/57
USPC ......................................................... 320/109
See application file for complete search history.

(56) References Cited

U.S. PATENT DOCUMENTS

| | | | | |
|---|---|---|---|---|
| 11,007,891 | B1 * | 5/2021 | Kamal | ............. H02J 13/00002 |
| 2012/0053742 | A1 * | 3/2012 | Tsuda | ..................... B60L 53/63 |
| | | | | 320/134 |
| 2013/0204471 | A1 | 8/2013 | O'Connell et al. | |
| 2015/0066228 | A1 | 3/2015 | Clifton | |
| 2017/0259683 | A1 | 9/2017 | Shimizu et al. | |

(Continued)

FOREIGN PATENT DOCUMENTS

EP 2 602 901 A1 6/2013

OTHER PUBLICATIONS

Bampoulas A, "Real-time energy storage mamangement system of a nanogrid intergrading photovoltaics and V2G opertation".

(Continued)

*Primary Examiner* — Richard V Muralidar
(74) *Attorney, Agent, or Firm* — Foley & Lardner LLP

(57) ABSTRACT

This disclosure discloses various technologies for sending electrical power from various energy storage stations to various nano-grid systems, when the energy storage stations and the nano-grid systems are not electrically wired to each other in order to enable such sending and when the nano-grid systems currently need a specific amount of the electrical power or are forecasted to need the specific amount of the electrical power by a specific time/date.

20 Claims, 8 Drawing Sheets

(56) References Cited

U.S. PATENT DOCUMENTS

2020/0101850 A1 * 4/2020 Harty ....................... B60L 55/00
2024/0195175 A1 * 6/2024 Shahriar ................ H02J 3/381

OTHER PUBLICATIONS

Bampoulas et al., "A Novel Dynamic Demand Control of an Electric
Vehicle integrated in a Solar Nanogrid with Energy Storage",
Department of Electrical Computer Engineering Democritus Uni-
versity of Thrace, Oct. 1, 2017. pp. 1410-1416.
Bracco S, "Nanogrids with reneweable sources, electrical storage
and vehicle-to-home systems in the household sector", Analysis for
a single-family dwelling, Jun. 23, 2019, pp. 1-6.
Foreign Search Report on PCT PCT/CA2021/050061 Dtd Mar. 29,
2021.
Skourous I, "Design Methodolyg of a DC Nanogrid incorporating
the V2G Technology", InIECON 2019-45th Annual Conference of
the IEEE Industrial Elecrontics Society. (vol. 1, pp. 5777-5782)
IEEE.
Wu et al., "Optimal Integration of a Hybrid Solar-Battery Power
Source into Smart Home Nanogrid with Plug-In Electric Vehicle",
Journal of Power Sources, vol. 363. Sep. 30, 2017, pp. 277-283.
International Preliminary Report on PCT Appl. Ser. No. PCT/
CA2021/050061 dated Aug. 4, 2022 (5 pages).
Examination Report Office Action on Australia Application No.
2021210366 dated Oct. 29, 2024 (2 pages).
Extended European Search Report on EPO App. 21744135.1 dated
Jan. 19, 2024 (24 pages).

* cited by examiner

MGCC – Mobile Grid Control Centre

CES – Central Energy Storage; $a = 1..m$

LES – Local Energy Storage; $x = 1..n$

SEV – Stored Energy Vehicles

NGC – Nano-Grid Controller; $x = 1..n$

LDC – Local Demand Controller; $y = 1..o$

DG – Distributed Generation; $z = 1..p$

LVNE – Low Voltage Network Elements

Met – Local Meteorological Data

CI – Consumer Inputs

UI – Utility Inputs

Communications Network

DELIVERY OF STORED ELECTRICAL ENERGY FROM GENERATION SOURCES TO NANO-GRID SYSTEMS

CROSS-REFERENCE TO RELATED APPLICATIONS

This application is the U.S. National Stage of PCT/ CA2021/050061, filed Jan. 21, 2021, which claims priority to the U.S. Provisional Application No. 62/963,841, filed Jan. 21, 2020, which are incorporated by reference in their entirety.

TECHNICAL FIELD

This disclosure relates to delivery of stored electrical energy from generation sources to nano-grid systems.

BACKGROUND

Electrical energy is an indispensable product for modern society. It powers a wide multitude of devices ranging from home appliances to factory furnaces. This versatile attribute of electrical energy makes its availability and reliability to be key requirements for an efficient and prosperous society. To achieve available and reliable electrical energy, some electric utilities operate and maintain a network of power lines in the form of an electric grid that interconnect various power generation and transformer stations with the electricity consumers, thus enabling supply of electrical energy upon demand. This approach has been the main architecture for electricity supply for decades.

While the approach to electricity delivery has not changed significantly, new methods to generation exist today in the form of renewable energy generators like wind and solar energy generators. With the advent of Internet of Things (IoT) and advances in energy storage technologies, another architecture for delivery of electricity should be possible. Such an architecture has the ability to realize the availability and reliability of the traditional grid, as well as the enhanced flexibility to incorporate evolving generation and consumption technologies and trends without the need to construct new transmission lines or underground cables which may not be possible due to the right of way constraints. It would be preferable to leverage these new technologies to provide energy delivery to localized, targeted consumers.

A technical problem exists in sending electrical power from various energy storage stations to various nano-grid systems, when the energy storage stations and the nano-grid systems are not electrically wired to each other (e.g., air gap) in order to enable such sending and when the nano-grid systems currently need a specific amount of the electrical power or are forecasted to need the specific amount of the electrical power by a specific time/date. What is needed is a way to leverage power generation, energy storage, and data analysis to provide for a new, cleaner, and optimized means for reliable energy delivery at localized, targeted consumers, even when those locations are not connected to a broader electric grid.

SUMMARY

Described herein are systems, methods, and apparatus that address the shortcomings in art discussed above, and may provide additional or alternative benefits as well. Generally, described herein is an enhanced electricity grid architecture that achieves availability, reliability, and flexibility of electricity supply, without a need for extensive wired distribution networks and associated transformer stations. Broadly, this disclosure addresses such technical hurdles in energy distribution by employing vehicles that are electrically charged at an energy storage station based on a computationally determined schedule and various vehicular energy storage characteristics. Once the vehicle is electrically charged, the vehicle is computationally routed to a nano-grid based on the computationally determined schedule, the vehicular energy characteristics, and various nano-grid energy characteristics. When the vehicle arrives at the nano-grid while being electrically charged, the vehicle can electrically discharge at the nano-grid based on the computationally determined schedule, the vehicular energy characteristics, and the nano-grid energy characteristics. As such, the vehicle enables sending of the electrical power when the energy storage stations and the nano-grid systems are not electrically wired to each other (e.g., air gap) in order to enable such sending and when the nano-grid systems currently need a specific amount of the electrical power or are forecasted to need the specific amount of the electrical power by a specific time/date.

In an embodiment, a system comprising a plurality of nano-grids, each nano-grid including a nano-grid storage appliance configured to store electricity for the nano-grid and a nano-grid computing device comprising a processor configured to execute software programming of a nano-grid controller; and a grid-control server in communication with a plurality of client computing devices including each nano-grid computing device and configured to execute software programming of a grid controller. The grid controller, when executed by the grid-control server, is configured to receive from one or more data sources energy data associated with the plurality of client computing devices in communication with the grid-control server; determine an energy requirement including an amount of energy for the nano-grid based upon the energy data received from the one or more data sources; and transmit to a vehicle computing device of the plurality of computing devices an instruction to discharge the amount of energy to the nano-grid storage appliance and geographic data for the nano-grid.

In another embodiment, a computer-implemented method for controlling mobile energy grid subsystems, in which the method comprises receiving from one or more data sources, by a grid-control server executing grid controller software, energy data associated with a plurality of client computing devices in communication with the grid-control server; determining, by the grid-control server, an energy requirement including an amount of energy for a nano-grid based upon the energy data for the nano-grid received from the one or more data sources; and transmitting, by the grid-control server, to a vehicle computing device of the plurality of computing devices an instruction to discharge the amount of energy to a nano-grid storage appliance of the nano-grid and geographic data for the nano-grid.

In yet another embodiment, a method comprises a grid-control server configured to execute software programming of a grid controller and in communication with a plurality of client computing devices, including a plurality of nano-grid computing devices; and a plurality of nano-grids, each nano-grid including a nano-grid storage appliance configured to store electricity for the nano-grid and a nano-grid computing device comprising a processor configured to execute software programming of a nano-grid controller. The nano-grid controller when executed by the nano-grid computing device is configured to transmit energy data associated with the nano-grid to the grid-control server;

update the energy data associated with the non-grid to include an additional amount energy, responsive to the nano-grid storage appliance receiving from a vehicle storage appliance an electric charge of the additional amount of energy corresponding to the energy data; and transmit to the grid-control server an indication that the nano-grid storage appliance has received the amount of energy from the vehicle storage appliance.

In another embodiment, a system comprises a server in communication with an energy supply client, an energy demand client, and a vehicular client, wherein the energy supply client includes a central energy storage station, wherein the energy demand client includes a nano-grid including a local energy storage station, wherein the central energy storage station is remote from the local energy storage station, wherein the vehicular client includes a battery payload, wherein the server is programmed to: receive a request from the energy demand client, wherein the request includes an amount of an electrical energy and a temporal factor corresponding to the amount of electrical energy; instruct the vehicular client to cause the battery payload to receive at least the amount of the electrical energy while being compliant with the temporal factor; determine a route for the vehicular client to travel between the central energy storage station and the local energy storage station while the battery payload is charged with at least the specific amount of the electrical energy and while being compliant with the temporal factor; cause the vehicular client to travel according to the route such that the vehicular client arrives at the local energy storage station while the battery payload is charged with at least the specific amount of the electrical energy and while being compliant with the temporal factor; instruct (a) the vehicular client to discharge at least the specific amount of the electrical energy from the battery payload to the local energy storage station while being compliant with the temporal factor and (b) the local energy storage station to receive at least the specific amount of the electrical energy from the battery payload while being compliant with the temporal factor.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

DETAILED DESCRIPTION

Figure 1A:
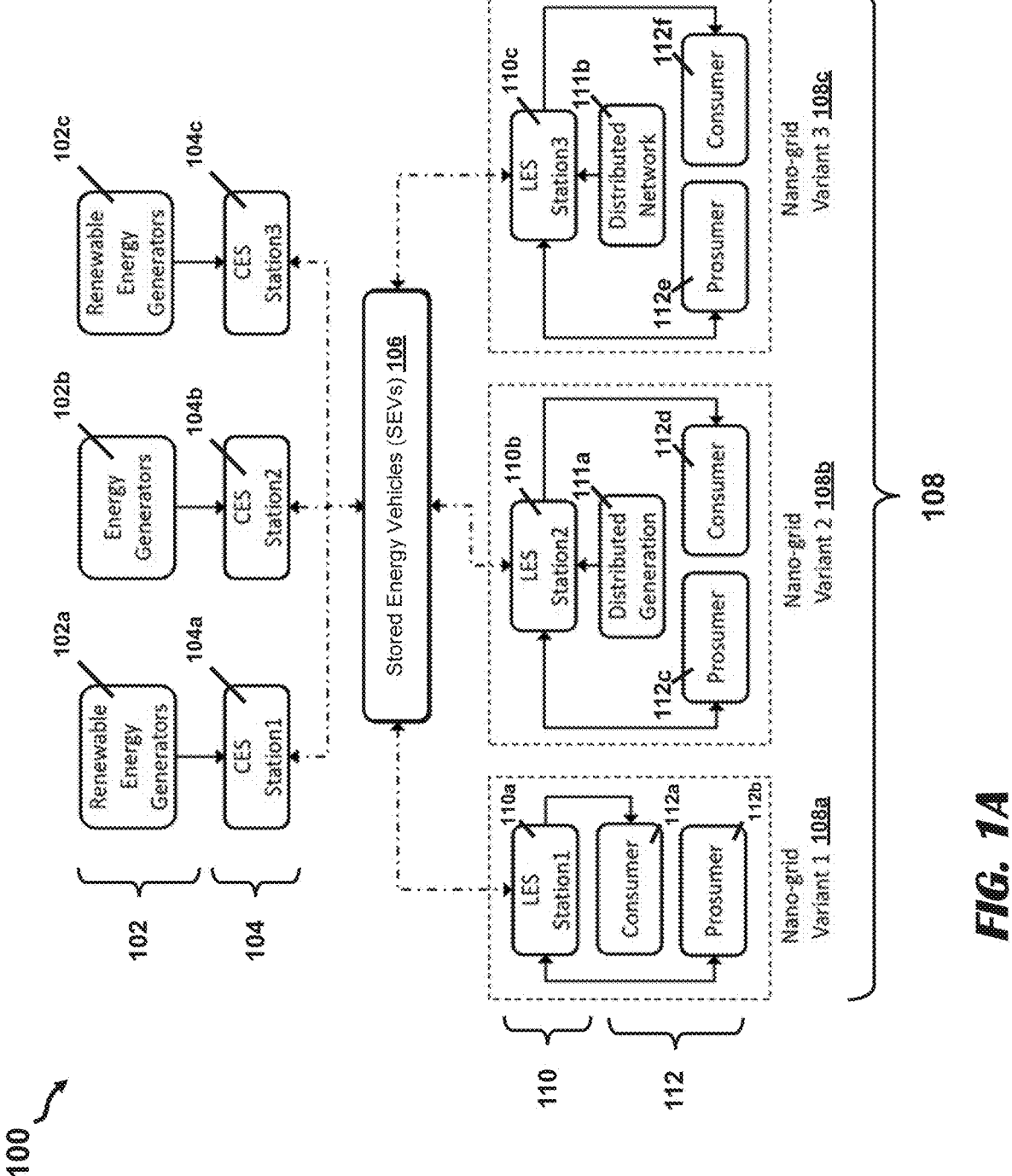
FIG. 1A shows a block diagram for a mobile electric grid, according to an embodiment.

Reference will now be made to the illustrative embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to a person skilled in the relevant art and having possession of this disclosure, are to be considered within the scope of the invention.

Generally, described herein is an enhanced electricity grid architecture that includes various technologies for sending electrical power from various energy storage stations to various nano-grid systems, when the energy storage stations and the nano-grid systems are not electrically wired to each other (e.g., air gap) in order to enable such sending and when the nano-grid systems currently need a specific amount of the electrical power or are forecasted to need the specific amount of the electrical power by a specific time/date. For example, a system can include a grid-control server (e.g., application, virtual), a plurality energy storage station client computers (energy supply client), a plurality of vehicle client computers (manned or unmanned), and a plurality of nano-grid client computers (energy demand client and/or prosumers), where the grid-control server is in real-time communication with energy storage station client computers, the vehicle client computers, and the nano-grid client computers.

Each of the vehicles associated with the vehicle client computers carries a payload of a vehicle energy appliance, including a rechargeable battery or a bank of rechargeable batteries. The vehicle client indicates or receives instructions related to whether the rechargeable battery or the bank of rechargeable batteries is involved or not involved in energizing movements of the vehicle client (e.g., charging or discharging energy). The server receives various energy data or energy information regarding, for example, state of charge or energy supply (e.g., current or forecasted capacity, technical characteristics, location, local current or forecasted weather, local current or forecasted traffic conditions) from the energy storage station clients. The server receives various vehicle information (e.g., type, technical characteristics, current travel range, locations, routes, local current or forecasted or on-route weather, local current or forecasted or on-route traffic conditions) and vehicle energy data, such as energy storage information (e.g., capacity, current charge level, time to recharge) from the vehicle clients. The server receives various energy data or information on energy demand (e.g., amount currently available, state of charge, energy requirement, specific energy amount needed, time/date when specific amount needed, local current forecasted weather, local current or forecasted traffic conditions).

Based on such information, the server is programmed to receive requests from the nano-grid clients requesting specific amounts of electrical energy by specific times/dates (temporal factor). As such, based on such information, the server is programmed to formulate optimized and scheduled routes for the vehicle clients to travel to the energy storage station clients (e.g., miles, tens of miles, hundreds of miles) and the vehicle energy storage appliance (e.g., batteries) of the vehicle clients with the electrical energy from the energy storage station clients. Further, based on such information, the server is programmed to formulate optimized and scheduled routes for the vehicle clients to travel from the energy storage station clients, after the batteries of the vehicle clients are charged via the energy storage station clients, to the nano-grid clients in order to timely deliver the electrical energy for discharging from the batteries of the vehicle clients responsive to the requests sent to the server from the nano-grid clients. Additionally or alternatively, vehicle clients may additionally deliver electrical energy between the local energy storage stations of various nano-grid clients. Such deliveries (between nano-grids) may be based on computationally determined factors, such as charge levels of the vehicle clients, charge levels of the local energy storage stations (of the respective nano-grids), and/or temporal factors.

This disclosure details this enhanced electricity grid architecture—a Mobile Electric Grid (MEG) that achieves availability, reliability, and flexibility of electricity supply, without a need for extensive wired distribution networks and associated transformer stations. The MEG involves an approach to reliably supply electrical energy to consumers, while minimizing or eliminating a need for static power lines between various energy storage stations and various nano-grid systems. This approach can be a data driven electric grid that matches real-time and forecasted energy demand with real-time and forecasted energy supply.

FIGS. 1A-1E show various example embodiments of a MEG system 100, including variants of subsystems. FIG. 1A is a block diagram showing components of the MEG system 100, including the various subsystems, which may include various charging stations and nano-grid systems (sometimes referred to as nano-grids) 108, where the subsystems may communicate electrical power or data.

As shown in FIG. 1A, the MEG 100 comprises one or more energy generators 102, one or more central energy storage (CES) stations 104, one or more stored energy vehicles (SEVs) 106, and one or more nano-grids 108. The example MEG system 100 includes several variants of nano-grids 108.

The MEG 100 can include a system of stationary and mobile hardware that manage, control, and deliver a reliable supply of electricity to end-consumers 112 within a given geographical area. One or more computing devices, such as servers or other forms of computing devices (e.g., personal computer, laptop computer, tablet), may execute software (referred to herein as "MEG controller" or "controller") that receives data from a variety of input sources in order to control and manage operation of components of the MEG 100. In some implementations, the computer-executed MEG controller may include or operationally communicate with a demand controller software component that monitors and acquires data on energy consumed by the end-consumers 112, and controls specific electric loads available to particular end-consumers 112. The demand controller may control loads according to artificial intelligence forecasted needs, in accordance with instructions from each end-consumer 112, and/or in accordance with instructions from a Mobile Grid Control Centre (MGCC). The artificial intelligence operations may be trained on various types of historical energy data that the MEG controller receives from various data sources. During a training phase for the artificial intelligence, values of the historical data are translated and converted into training feature vectors that are fed into the artificial intelligence engine. The MEG controller then applies the one or more layers of the artificial intelligence on the training vectors to train the various parameters of the layers. During testing (e.g., deployment), the MEG controller receives corresponding types of data, then translates and converts the data into a test vector that is fed into the artificial intelligence. The artificial intelligence engine then outputs, for example, the desired forecast or predicted energy needs, shortcomings, or surpluses.

The computing devices, as used herein, may include any device having hardware (e.g., processor, programmable logic controller) and software capable of performing the various functions and features described herein, such as controller software (sometimes referred to as "controllers") for controlling operations of various subsystems of the MEG 100.

The controllers receive data from various data sources to perform various processes and tasks for the subsystems, where the data sources include the components of the subsystems and external data sources (e.g., weather servers hosting meteorological data). The processes include, for example, monitoring energy data, determining energy shortfalls or surpluses, and managing the various subsystems (e.g., nano-grids 108, LES stations 110).

Controllers managing, for example, the generators 102 and CES stations 104 monitor and manage energy generation, storage, output. For instance, controllers manage power converters of renewable energy generators 102a, 102c (e.g., wind generators, solar generators), which typically require the power converters in order to output maximum power with the acceptable quality in a stable manner. Operating the power converters may require constant data monitoring. The controllers comprise and execute software algorithms to ensure stable energy output. For example, a wind farm may produce a spike in voltage due to a spike in wind. A controller monitoring the wind generator may detect the voltage spike and immediately determine a corrective action. The corrective action may include instructing the renewable generator 102a, 102c to dial down the amount of power generated or by modulating the reactive power produced. Additionally or alternatively, rather than reducing the power generated, the corrective action could include sending the surplus energy to one or more energy appliances at the subsystems of the MEG 100. The controller can determine to send the additional energy to the one or more energy storage appliances and store the energy for later discharge at another time. The controllers described herein affirmatively control any variable energy generation within the MEG 100 and maintain stability across the MEG 100, whereas most conventional electrical grid monitoring software solutions rely upon the grid components to maintain stability. Using the vehicle delivery and controller-based determinations, the electrical energy is delivered to end-consumers over various distances while maintaining predictable amounts of energy, without, for example, the need for transmission lines and power transformers.

In some implementations, the vehicle computing device is configured to: monitor a state of charge of a vehicle storage device; and instruct the vehicle storage device to charge or discharge a predetermined amount of energy at one or more nano-grids of the plurality of nano-grids, wherein an amount of voltage or energy for the predetermined amount of energy is not increased (or stepped up) for delivery to each geographic location of the one or more nano-grids.

An energy generator 102 is a system of hardware and software components that generate electricity, operationally managed by one or more computer-executed software controllers. An energy generator may be any size and operate at any scale, and may implement any form of electricity generation (e.g., natural gas, coal, nuclear). In some instances, an energy generator is a renewable energy generator 102a, such as a wind or solar power generating system. An energy generator 102 may be standalone (e.g., "air gapped"), connected to one or more additional energy generators 102, or connected to a wider power grid. Consumers of the MEG 100 system can include any of residential, commercial, and industrial electricity consumers 112, or any combination thereof.

Figure 1B:
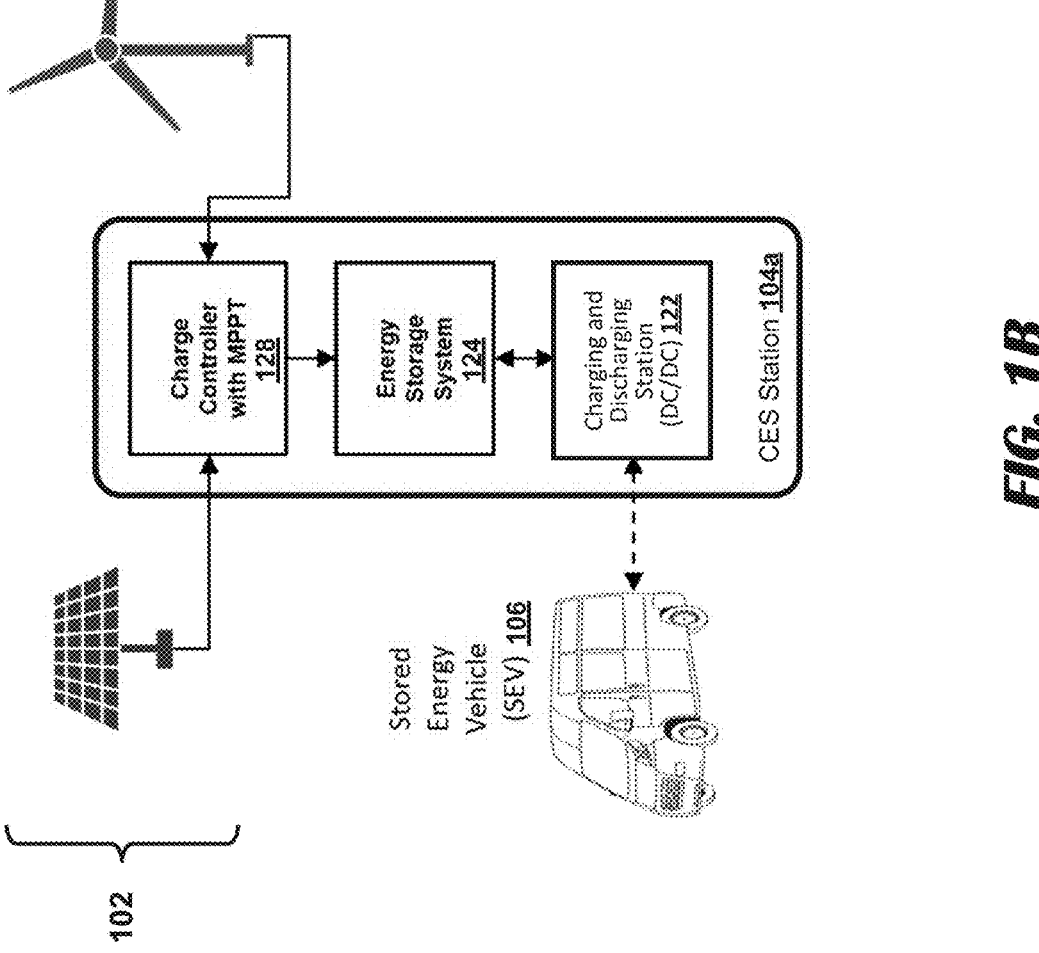
FIG. 1B shows a central energy storage station, according to an embodiment.

A central energy storage (CES) station 104 stores electricity generated by one or more energy generators 102. As shown in FIG. 1B, a CES 104*a* includes a main energy storage system 124 having hardware and software components for storing electricity loads generated by a corresponding energy generator 102*a* that is electrically coupled to the CES 104*a*. As seen in FIG. 1A, a CES 104 may be collocated with, or remote from, a generator 102 system.

Figure 1C:
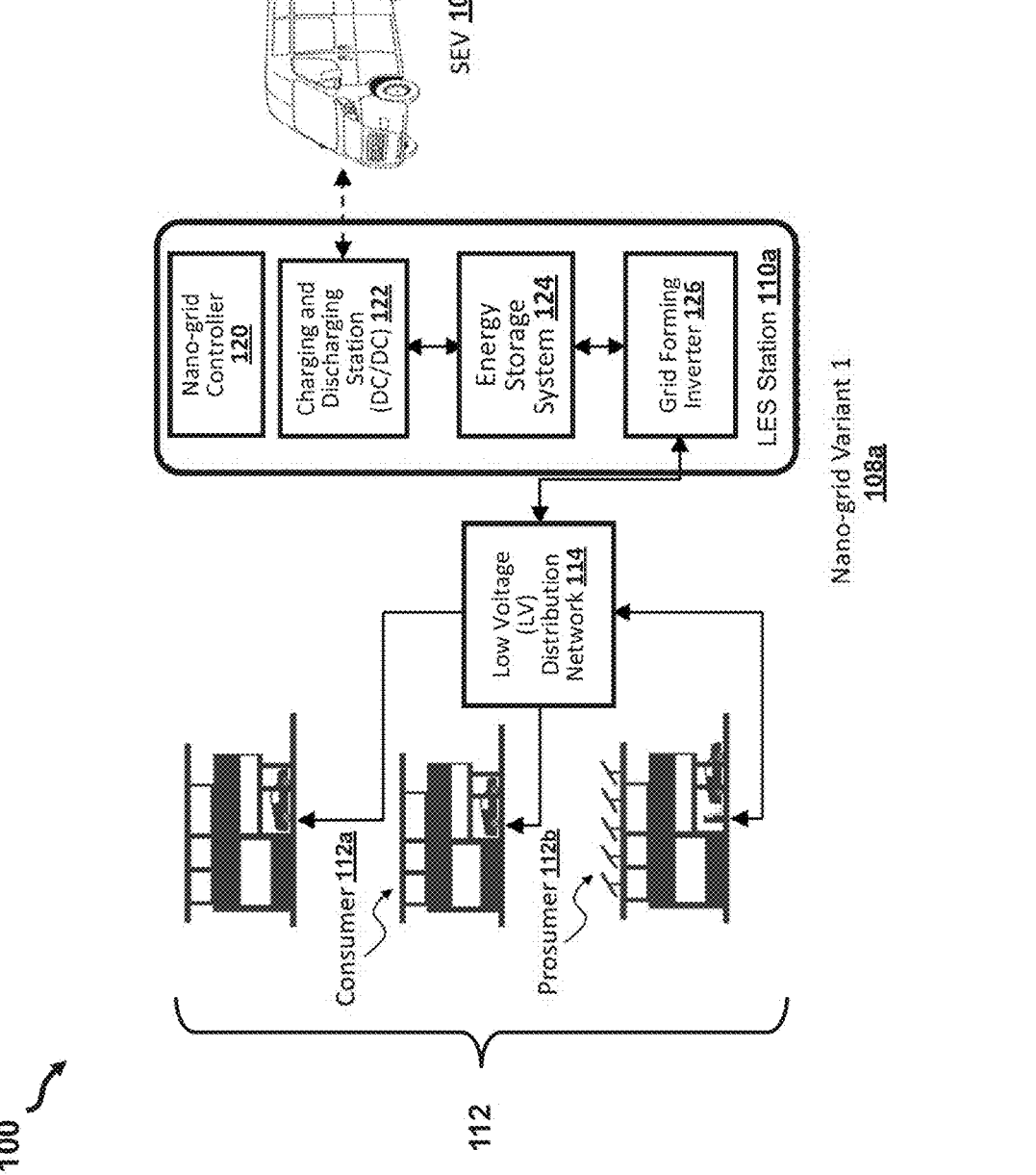
FIG. 1C shows a nano-grid variant, according to an embodiment.
Figure 1D:
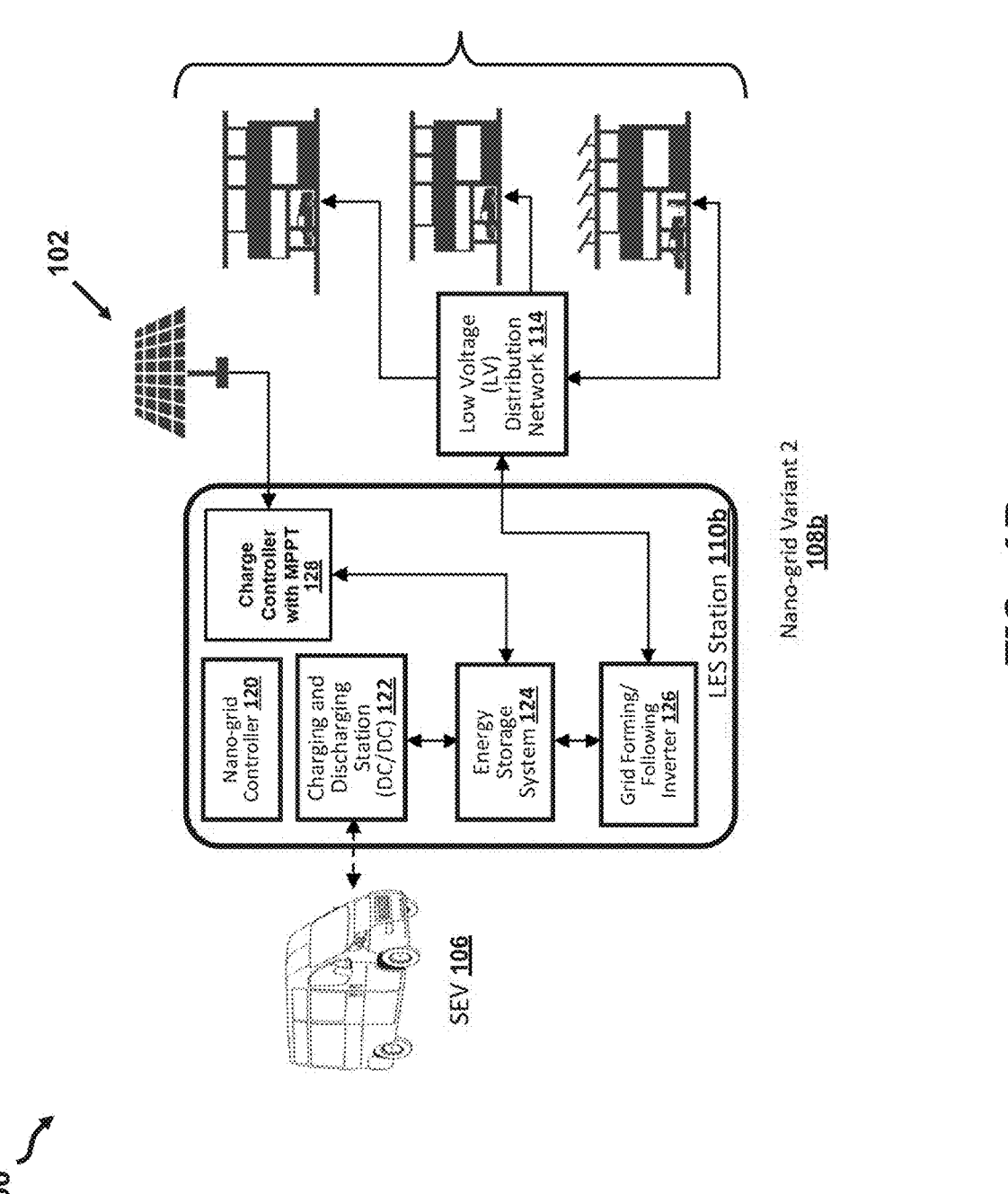
FIG. 1D shows a nano-grid variant, according to an embodiment
Figure 1E:
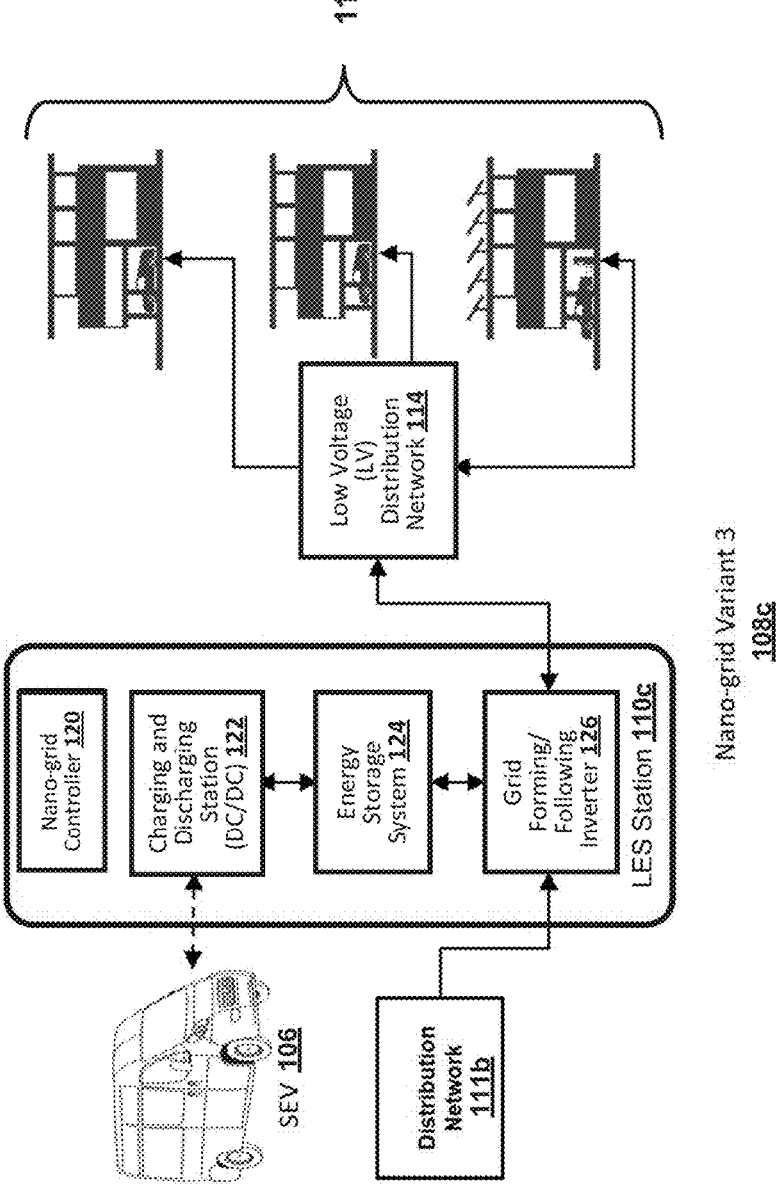
FIG. 1E shows a nano-grid variant, according to an embodiment.

Local Energy Storage (LES) stations 110 store electricity for one or more nano-grids 108. As shown in FIGS. 1C-1E, each LES 110 includes an energy storage station system 124 that is located within or collocated with a corresponding nano-grid 108, and includes energy storage devices 124 (e.g., batteries) and a grid forming/following inverter 126 (e.g., direct-to-alternating current). In some instances, an LES 110 includes an electricity charge and discharge station 122 to interface with the SEVs 106 to be compliant with a desired amount of energy for service delivery goals. It should be appreciated that electric delivery to an LES 110 may be accomplished through one or more methods and mediums. For instance, electric delivery to an LES 110 may be accomplished through the charge and discharge station 122 as mentioned. But in some circumstances, the electric delivery may also be accomplished through replacement or swapping of depleted battery storage devices within the LES 108. In these circumstances, battery payloads may be carried by the SEV 106.

A Mobile Grid Control Centre (MGCC) (not shown in FIGS. 1A-1E) can include a control room within a building, an underground facility, a mobile facility (e.g., truck, bus, boat, airplane), or a data center that houses command and control software and personnel who monitor and operate the MEG 100 for a designated geographical area. The computing devices of the MGCC, such as data center servers and/or other computing devices (e.g., personal computers, laptop computers, tablets), may be communicatively coupled over one or more public or private networks to computing devices of the MEG 100 system, such as servers that execute controllers for controlling energy generators 102. The MGCC computing devices may receive various data inputs, such as energy data (e.g., present or historic state of charge; present or historic energy consumption), and store the data into servers of the MGCC data center. The MGCC computing device may transmit instructions and data updates to the various computing devices in the MEG 100 system. The instructions may be automatically generated by controller-executed algorithms or may be inputted by an administrative user via a GUI of a user's computing client device.

The nano-grid 108 can include a collection of one or more (e.g., two, three, four, or more) end-consumers 112, which may be consumers or prosumers, where prosumers are a type of end-consumer 112 with an ability to self-generate (e.g., solar, wind) part or all of the prosumer's electrical energy needs. End-consumers 112 may be collocated within a geographical boundary (e.g., geographic region/area) and connected to a LES station 110 through associated power electronics via high or low voltage distribution wires. In some cases, a nano-grid 108 can be an electrical island that is not electrically wired to a conventional power grid.

The nano-grid 108 may have a computing device, such as a server, that executes nano-grid controller (NGC) 120 software, which can include an energy management algorithms that maintains reliable supply of electricity for a given nano-grid 108 and monitors energy usage by end-consumers 112 of the nano-grid 108.

MEG 100 system is serviced by one or more SEVs 106 in accordance with the instructions from devices of the MGCC.

SEVs 106 can include transport vehicles that carry stored electrical energy in batteries for recharge/discharge delivery between various CES 104 and LES stations. The transport vehicles can be land vehicles (e.g., cars, buses, trucks), aerial vehicles, or marine vehicles, whether manned or unmanned, whether autonomous or non-autonomous. The land vehicles can be powered via internal combustion engines or batteries, and can include bi-directional electric or hybrid vehicles. In some implementations, SEVs 106 can be automatically or manually scheduled by one or more devices of the MEG system 100 to charge/discharge specific amounts of electrical energy from their batteries at the CES stations 104 or the LES stations 110.

In operation, the servers of the MEG system 100 establish a data driven electric grid, matching real-time and forecasted energy demand with real-time and forecasted energy supply. To achieve this match-making, the MEG system 100 includes computer-executed controllers at each level of the MEG system 100 that include data acquisition and analyses, machine learning and deep learning algorithms, which determine the optimal uses for the various battery storage technologies, power generation electronics, and transport vehicles that carry stored electrical energy. The MEG 100 is thus able to achieve a reliable and flexible electricity delivery system that meets at least some needs of the energy consumers and prosumers as their demands evolve. The MEG 100 represents a novel approach to deliver electricity in an informed and quantized manner.

The MEG 100 includes a network of nano-grids 108 whose stability is maintained by in-situ nano-grid controllers 120. Energy demand by end-consumers 112 (e.g., prosumers and consumers) connected to these nano-grids are met by in-situ generation and/or energy drawn from the LES stations 110 within the respective nano-grids 108, according to the nano-grid controllers 120. The LES stations thus provide energy supply for consumers and energy supply and reliability backstop for prosumers. The schedule and quantity of energy delivered, via the SEVs 106, to LES stations in nano-grids is determined and scheduled automatically and/or manually by computing devices at the MGCC, taking into consideration demand forecast for both prosumers and consumers in the nano-grids and available energy resources at CES stations 104. Redundancies are built into the MEG 100 in a form of additional storage capacity at the LES stations 110 to account for any delayed or missed delivery by SEVs 106.

Each of the LES stations 110 includes a grid forming inverter to control at least some power quality delivered to the prosumer and consumers. Stationary energy storage systems may be located at charging stations and at SEV 106 interfaces with the nano-grids 108. Energy storage systems 124 may also be onboard the SEVs 106, which are of different characteristics and requirements from those at the CES stations 104 and the LES stations 110.

The energy storage systems of SEVs 106 can include payload systems (e.g., payload batteries) and operational systems (e.g., car batteries). The payload systems include those energy storage systems and components of an SEV 106 employed for electric delivery (e.g., payload system, payload battery). The operational systems include those energy storage systems 124 and components involved in operations of the SEVs 106. In some cases, the payload systems of an SEV 106 are electrically and/or structurally, and operationally distinct from the operational systems of the SEV 106. And in some cases, the payload systems of an SEV 106 are not operationally separate and distinct from the operational systems involved in the operations of the SEV 106.

The controller software executed by the various servers continuously monitor the types of electricity storage systems to ensure the state of health to achieve a predictable cost of electricity over a certain duration.

Figure 2:
FIG. 2 shows a communication and control hierarchy, according to an embodiment.
Figure 2:
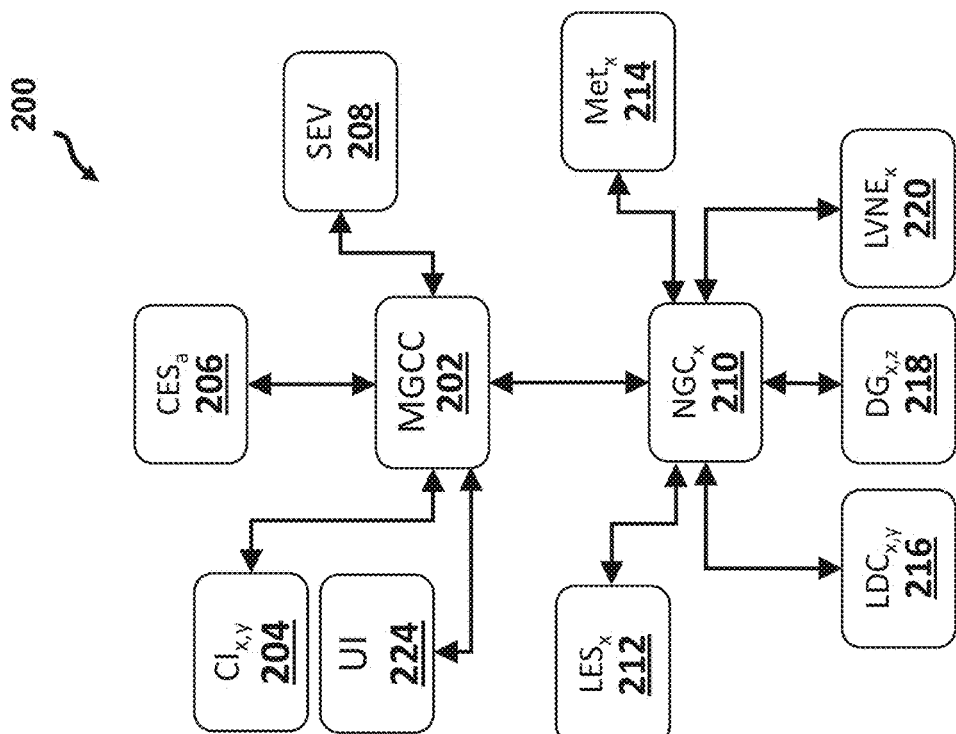

FIG. 2 shows components for communication and control hierarchy of a MEG system 200, according to an embodiment. The MEG system 200 includes various subsystems comprising servers that execute controller software for controlling operations of the particular subsystems, such as a MEG controller (of the MGCC 202) or nano-grid controllers (NGC 209), among others. The MEG system 200 comprises a control and communication network architecture hosting data communications between the various subsystems of the MEG system 200.

The network architecture includes various hardware and software components of one or more public or private networks that interconnect the various subsystem components of the MEG system 200. Non-limiting examples of such communications networks may include Local Area Network (LAN), Wireless Local Area Network (WLAN), Metropolitan Area Network (MAN), Wide Area Network (WAN), and the Internet. The communication over the network may be performed in accordance with various communication protocols, such as Transmission Control Protocol and Internet Protocol (TCP/IP), User Datagram Protocol (UDP), and IEEE communication protocols.

The control of the MEG system 200 relies on a centralized concept to operate the MEG system 200 in an efficient and secure manner, where the MEG system 200 is operationally controlled by the one or more servers that execute the software controllers located at each subsystem. The controllers receive and evaluate information for governing the operations of the subsystems, such as operational data for generators, geographic information for the various subsystem locations, energy storage indicating inventory at given locations, amounts of energy in transit, historical and forecasted energy consumption, weather forecast (e.g., meteorological data 214), and the like.

A local demand controller (LDC) 216 and NGC 210, at a nano-grid or at power generator, may be configured to allow a safe and reliable operation of the network, even under a loss of a communication network.

Servers (or other computing devices) at the MGCC 202 may supervise some, most, or all operations of the MEG system 200 to allow an optimal utilization of various available energy resources while maximizing a needed level of power quality to the consumers and prosumers. For instance, the server of the MGCC 202 sends set-points to CES stations 206 and coordinates with the CES stations 204 to issue the commands to the SEVs 208 to charge/discharge certain amounts of electricity, to achieve the various set goals of the MEG system 200. In some implementations, the servers of the MGCC 202 receive, from the servers of the CES stations 206, the status and health conditions of the particular CES stations 204. The server of the MGCC 202 evaluates the status, health conditions, and operational details to ensure the reliable and safe operation of these subsystems.

The CES stations 204 communicate (e.g., wirelessly, wired) with the LES stations 210 to dispatch and control operations of the LES stations 210, while ensuring safe and reliable conditions. The LES stations 212 communicate (e.g., wirelessly, wired) with the NGCs 209 to exchange set-points and monitoring information.

The NGC 210 of the nano-grid enables various operations of a low voltage (LV) distribution network including home controllers, distributed generation controllers and network elements to achieve some, many, most, or all goals for a safe and reliable operation of the nano-grid. The NGC 210 includes various distribution management system capabilities, such as Network Connectivity Analysis, State Estimation, Volt-VAR Control, Load Shedding Application, Load and Generation Forecasting, Feeder reconfiguration, Fault Management, and System Restoration, Demand-side management (DSM), or others. These capabilities can help the MEG system 200 to achieve various goals, such as increase system reliability, reduce outage duration, increase system efficiency, improve power quality indices, increase integration of renewable energy sources, enhance asset management, reduce operations and maintenance costs, or others.

The MGCC 202 evaluates various types of data inputs from various data sources. For instance, servers of the MGCC 202 evaluate and model energy data from of various utility systems 224 and other subsystems of the MEG 200. Non-limiting examples of the data inputs include: real-time and planned geographic locations of SEVs 208; real-time and forecasted SoC for the SEVs 208 in a geographical boundary (e.g., region of service); real-time and forecasted surplus or shortfall of energy at LESs 212 for given NGCs 210; real-time and forecasted SoC at CESs 206; consumption indicators from consumers connected to the NGCs 210, which may indicate forecasted reduction in electricity consumption for a given monetary or non-monetary credit (consumer incentive) for a defined forward-looking period; consumption and production indicators from a utility system 224 indicating forecasted amounts of energy to supply or absorb for a given price (utility system 224 incentive) at a particular LES station 212 connected to the MEG 200; and production indicators from a generator indicating amounts of energy to supply for a given price (generator incentive) to a CES station 206.

The MGCC 202 executes controllers to receive and/or determine the real-time and forecasted parameters from NGCs 210, SEVs 208, and CES 206. The MGCC 202 may forecast and/or identify shortfall or surplus electricity at various subsystems of the MEG 200 based on the data inputs from various data sources (e.g., subsystem inputs, database 408) and/or based on the VMPP model 404 outputs. The MGCC 202 may determine certain subsystems to charge/discharge electricity to achieve balance and appropriate amounts of electricity at the subsystems of the MEG 200, and transmit machine-readable charge/discharge instructions or human-readable instructions (e.g., incentives) to, for example, consumers, generators, and utility system 224. Upon determining how to achieve energy balance across the MEG 200 using, for example, price commitments and credits, the MGCC 202 determines the schedule and delivery routes of the SEV 208 fleet to achieve energy balance of the overall MEG 200 with the lowest cost of operation for given time steps.

Figure 3:
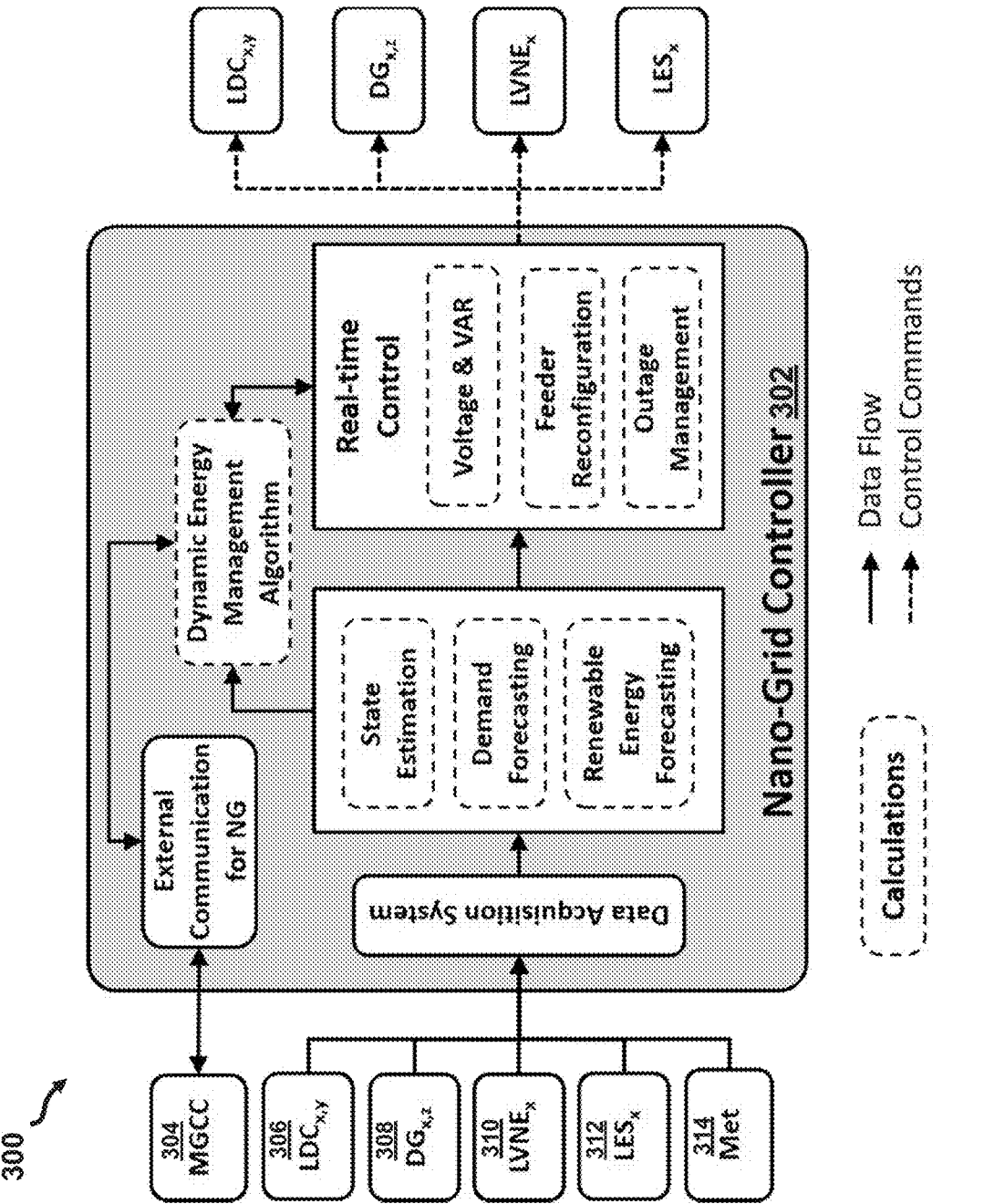
FIG. 3 shows a nano-grid controller schematic according to this disclosure.

FIG. 3 shows components associated with a NGC 302 of a MEG system, according to an embodiment. The NGC 302 has various functions. Some of such functions include maintaining a real-time voltage and frequency balance for a given nano-grid. This approach includes employing algorithms that perform assessments including state estimation, voltage and VAR calculations, feeder configuration and outage management. This approach includes inputs including real-time data via a data acquisition system connected to nano-grid elements including (i) local demand controller (LDC) 306, including the demand at each consumption node (e.g., devices of end-consumers); (ii) distributed generation (DG) 308, including energy generation at each distributed generation 328 system connected to the NGC 302; (iii) low voltage network elements (LVNE) 310, including the voltage and frequency state at low voltage network elements; (iv) Local Energy Storage (LES) 312, including the status of charge available at the local energy storage, or others. This approach includes outputs including real-time instructions to nano-grid network elements through switches and setpoint parameters in order to achieve nano-grid balance.

Some of such functions also include performing forward looking (forecasted) load and renewable energy generation data at defined timesteps for a given nano-grid. This approach includes an optimization tool incorporating energy management and machine learning algorithms to determine a forecasted nano-grid balance state for defined time steps. Each iteration quantifies projected energy shortfall or surplus at the LES 312 of the nano-grid. Optimization continues in order to minimize shortfall while achieving nano-grid balance. This approach includes inputs including forecasted data at defined timestamps including: (i) DG 308 forecasted generation, (ii) energy usage patterns at each consumption node, (iii) end-consumer defined inputs (e.g., smartphone, tablet, laptop, computing terminal) for consumption, (iv) SEV delivery schedule, (v) LES 310 energy levels, or others. This approach includes outputs including communicating to the MGCC 304 projected shortfall/surplus of energy at the given nano-grid for defined time steps for SEV scheduling.

The MGCC 304 has various functions. Some of such functions include meeting energy demand at various nano-grids with minimum number of SEV deliveries. This approach includes employing a fleet management program that takes in data on SEVs available in the network and coordinates deliveries to specified LES 312 stations for various nano-grids. This approach includes inputs including availability, location and energy level in SEVs, planned route schedule for SEVs, operator inputs (e.g., smartphone, tablet, laptop, workstation) for disruptions to planned schedule, or others. This approach includes outputs including dispatching according to planned schedule, reroute planning due to operator inputs, or others.

Some of such functions also include scheduling SEV deliveries based on forecasted data. This approach includes employing artificial intelligence tools to forecast quantity of SEVs needed to meet forecasted demand within a given service radius to ensure reliability of the service. This approach includes inputs including forecasted data for given timestamps including surplus or shortfall at LES stations, forecasted energy level at CES stations, SEV availability, weather events (e.g., meteorological data 314) impacting SEV service, or others. This approach includes outputs including SEV delivery scheduling for defined time step and route planning, determining shortfall with in MGCC service radius and send demand management incentive to consumers, or others.

Based on above, the NGC 302 for the LES 312 can communicate with the MGCC 302 to request a specific amount of electrical energy by a specific time/date to be delivered by the SEV from the CES to the LES 312. Further, the SEV can be a dedicated or a retrofitted vehicle (e.g., trucks, buses) that can rapidly (e.g., less than 1 hour) charge from the CES or discharge to the LES 312, whether or not the SEV is or is not related to electrical energy storage delivery or provision or other services. The batteries of the SEV can be or can avoid being operationally involved in moving the SEV. Also, the SEV can wirelessly communicate location and charge level to the MGCC 322. Moreover, the SEV can timely discharge the specific amount of electrical energy requested, as communicated in advance or at discharge time, to the SEV from the MGCC 322, based on the request submitted by the LES 312, whether via automated software algorithms of the LES 312 or via user devices (e.g., tablets, smartphones, laptops, terminals, electrical panels) logically associated with the LES 312. In order to minimize fraud, the LES 312 is instructed to withdraw only the specific amount of electrical energy, as originally requested, or programmatically capped to that specific amount (less than requested is permitted).

Based on scheduled SEV electrical energy deliveries from CES stations to LES 312 stations, the MEG 300 enables delivery of electrical energy to end-consumers in a quantized form that meets demand in a safe and reliable manner, provides grid level reliability for electricity supply whilst maximizing self-generation capability of the prosumer.

As a result, the MEG 300 solves a reliability gap for variable rooftop solar generation systems. This eliminates the need for such prosumers to be connected to the traditional static grid. The nano-grids within the MEG 300 can be self-regulating for energy supply, voltage, and frequency and electrically disconnected from other nano-grids. This enhances resilience of the nano-grids as the nano-grids are not affected by any power outages or issues with adjacent nano-grids. The MEGs 300 are more resilient against adverse weather events where the LES 312 stations can be pre-charged with additional energy prior to a forecasted weather event, according to the meteorological data 314 evaluated by one or more controllers of the MEG 300. The MEG 300 and associated nano-grids have faster set up times compared to conventional static grids as nano-grids typically do not include pole-mounted wires that have to be erected over long distances. The MEG 300 enables expansion of electricity supply service to new end-consumers within a given geographical area by adding additional LES 312 stations and associated infrastructure thus facilitating the expansion of communities. Additionally, the MEG 300 allows for shrinkage of communities by relocation of LES 312 stations. The MEG 300 provides an enhanced user experience for supply of electricity. With quantized delivery of energy, the end-consumers (e.g., consumers, prosumers) have access to additional options on scheduling timing, amount, and price of energy they intend to consume. The MEG 300 promotes build out of distributed renewable energy generation based on proximity to nano-grids within a geographical area. The MEG 300 can use under-utilized fleet of vehicles, such as public transport at night time and traditional delivery services such as the postal system and couriers, for delivery of stored energy as quantized delivery of electricity on demand can help reduce or prevent electricity theft through passive siphoning. The MEG can supply electricity service to a subsystem (e.g., nano-grid) at a geographic location not in the proximity of any utility grid or in the location of a utility grid that no longer has sufficient energy, due to an event (e.g., meteorological event) or other shortage.

For example, a renewable energy farm has a photovoltaic array, a wind turbine, a first controller, a first battery, and a first charging/discharging station. The photovoltaic array and the wind turbine generate renewable energy and are controlled via the first controller to send that energy for electrical storage into the first battery. The first charging/discharging station is configured to dock with a vehicle (e.g., truck, bus, boat) carrying a battery payload such that the battery payload can be electrically charged. Then, the vehicle is computationally routed to a geographic location of a nano-grid (e.g., remote village, disaster area, battlefield) having a second controller, a second charging/discharging station, a second battery, an inverter, a low voltage distribution network, a consumer load, and a prosumer unit equipped with a renewable energy source. The SEV docks with the second charging/discharging station and discharges the battery payload, as controlled via the second controller, such that the second battery is charged. The low voltage distribution network receives at electrical energy from the second battery through the inverter. The consumer load and the prosumer unit receive the electrical energy from the low voltage distribution network. The renewable energy source of the prosumer unit generates renewable energy and sends that energy to the low voltage distribution network to augment power of the low voltage distribution network or recharge the second battery through the low voltage distribution network and then the inverter.

Figure 4:
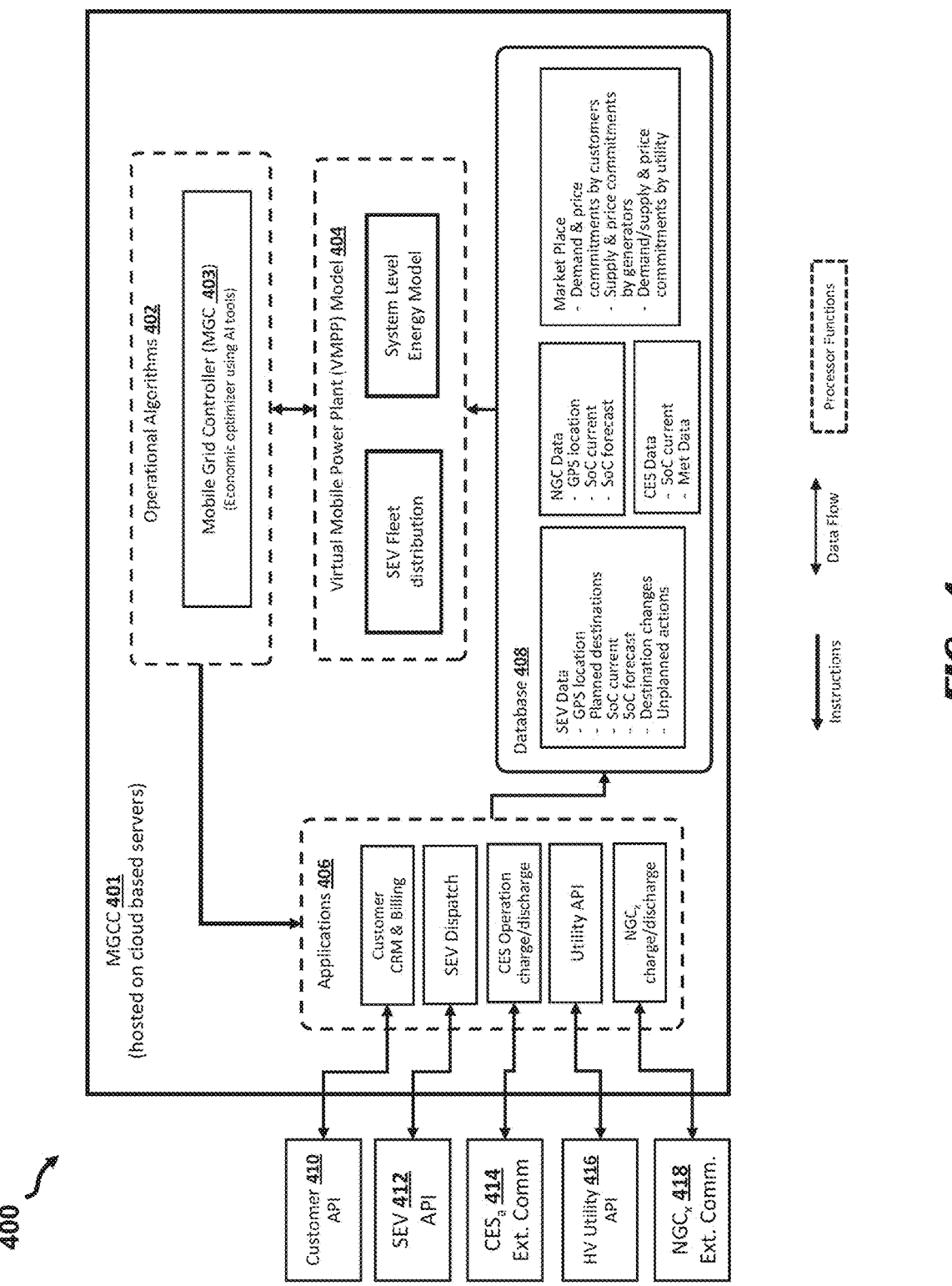
FIG. 4 shows components associated with a MGCC of a MEG system, according to an embodiment.

FIG. 4 shows components associated with a MGCC 401 of a MEG system 400, according to an embodiment. The MGCC 401 is hosted on one or more cloud servers comprising hardware (e.g., processors, non-transitory machine-readable media) and software components configured to perform the various processes and tasks described herein. The MGCC 401 executes operational algorithms 402 including an MGC 403 and virtual mobile power plant (VMPP) model 404, and various applications 406 managing energy-related operations with various subsystems of the MEG system 400. The MGCC 401 further includes one or more databases 408 that receive and store various types of data from the subsystems and other external data sources, such as meteorological data and/or traffic data, which the various hardware and software components of the MGCC 401 query and analyze.

The processor executes the MGC 403 and Virtual Mobile Power Plant (VMPP) 404 software to monitor and manage the MEG 400. The MGCC 401 determines efficient and economical operations for the MEG 400, which includes calculating and maintaining balance for supply and demand of electricity across the subsystems of the MEG 400. Using data inputs received from various data sources, the MGC 403 solves MEG 400 optimization problems that, for example, minimize the cost of electricity for customers 410 of the MEG 400. The servers of the MGCC 401 simultaneously host the VMPP model 404 of a network of utility systems 416 of the MEG 400, where the VMPP model 404 is driven by the MGC 403. The MGC 403 generates various solutions of this optimization problem results and commands based on the calculated results and the MGCC 401 then transmits the commands to one or more NGCs 418, SEVs 412, and CES stations 414. The MGC 403 and/or the VMPP 404 include ratification intelligence programming techniques (e.g., evolutionary techniques, machine learning techniques) that solve the optimization problems, generate the optimization results, and transmits commands for the various subsystems to charge/discharge energy in order to achieve balance of the State of Charge (SoC) (or another desired SoC) at the various subsystems.

The VMPP model 404 is populated with and evaluates various types of data inputs from various data sources. Non-limiting examples of the data inputs for the VMPP model 404 include real-time and planned geographic locations of SEVs 412; real-time and forecasted SoC for the SEVs 412 in a geographical boundary (e.g., region of service); real-time and forecasted surplus or shortfall of energy at LESs for given NGCs 418; real-time and forecasted SoC at CESs 414; consumption indicators from consumers 410 connected to the NGCs 418, which may indicate forecasted reduction in electricity consumption for a given monetary or non-monetary credit (consumer incentive) for a defined forward-looking period; consumption and production indicators from a utility system 416 indicating forecasted amounts of energy to supply or absorb for a given price (utility system 416 incentive) at a particular LES station connected to the MEG 400; production indicators from a generator indicating amounts of energy to supply for a given price (generator incentive) to a CES station 414.

The VMPP model 404 is built and executed (e.g., simulated MEG 400) within modeling and/or virtualization software programming. The MGC 402 algorithm executes and interacts with the VMPP model 404 with the realtime and forecasted parameters from NGCs 418, SEVs 412, and CES 414. The MGC 402 may forecast and/or identify shortfall or surplus electricity at various subsystems of the MEG 400 based on the data inputs from various data sources (e.g., subsystem inputs, database 408) and/or based on the VMPP model 404 outputs. The MGC may determine certain subsystems to charge/discharge electricity to achieve balance and appropriate amounts of electricity at the subsystems of the MEG 400, and transmit machine-readable charge/discharge instructions or human-readable instructions (e.g., incentives) to, for example, consumers 410, generators, and utility system 416. Upon determining how to achieve energy balance across the MEG 400 using, for example, price commitments and credits, the MGC 403 determines the schedule and delivery routes of the SEV 412 fleet to achieve energy balance of the overall MEG 400 with the lowest cost of operation for given time steps.

The MGCC 401 manages the CES stations 414. The MGCC 401 sends charging and discharging commands to the CES stations 414 according to the optimal dispatch of the complete mobile-grid. The MGC 403 for this functionality includes the forecasting module of the central renewable energy sources to predict the available renewable energy in the time horizon used for the optimization of the MEG 400. The MGC 403 would also maintain the state of charge of the energy storage systems within the acceptable range to maintain the lifetime of the storage as much as possible.

The MGCC 401 manages the fleet of storage vehicles. The MGCC 401 will request the needed vehicles destinations and energy. This takes into account the availability of the vehicles including their maintenance routines. The MGCC 401 also minimizes the losses in the transport process by trying to coordinate and schedule the trips between the different local energy storage stations.

The MGCC 401 manages customer relation and billing. The MGCC 401 transmits consumer incentive through the Customer CRM and billing application. MGCC 401 manages a marketplace for balancing surplus energy and energy requirements (e.g., deficits, forecasted needs) to maintain a residual energy balance. The MGCC 401 issues demand, supply, and associated price notifications to the customers, generators operating the CES stations 414, and the utility 416 to secure demand, supply, and price commitments for any residual surplus or shortage of energy in the MEG 400 for a defined timestep. The residual amounts are determined following economic optimization of the existing resources and price points.

The MGCC 401 plans the future expansion using energy data. The MGCC 401 gathers the operational data of the MEG 400 from the different subsystems to help in the planning of any additions or expansions in the system. This data log will also be used to perform operator training and capacity building.

In some embodiments, a system comprises a plurality of nano-grids and a grid-control server. Each nano-grid includes a nano-grid storage appliance con-figured to store electricity for the nano-grid and a nano-grid computing device comprising a processor configured to execute software programming of a nano-grid controller. The grid-control server is in communication with a plurality of client computing devices including each nano-grid computing device and the grid-control server is configured to execute software programming of a grid controller. When the grid controller is by the grid-control server, the grid-control server is configured to: receive, from one or more data sources, energy data associated with the plurality of client computing devices in communication with the grid-control server; determine an energy requirement including an amount of energy for the nano-grid based upon the energy data received from the one or more data sources; and transmit to a vehicle computing device of the plurality of computing devices an instruction to discharge the amount of energy to the nano-grid storage appliance and geographic data for the nano-grid.

In some implementations, the grid-control server is further configured to: receive an indication from the nano-grid controller that the nano-grid storage appliance has received the amount of energy of the energy requirement; and update a database to indicate the amount of energy discharged to the nano-grid.

In some implementations, the grid-control server is further configured to: determine an energy surplus including a surplus amount of energy for a second nano-grid based upon the energy data received from the one or more data sources; and transmit to the vehicle computing device a second instruction to charge, from a second nano-grid storage appliance of the second nano-grid, the surplus amount of energy.

In some implementations, the plurality of client computing devices in communication with the grid-control server further includes an energy supply server coupled to a central energy storage station. Moreover, the grid-control server is further configured to: receive the energy data associated with the central energy storage station from the energy supply server; and update a database to include a centralized amount of energy at one or more cen-tral energy storage stations.

In some implementations, the one or more data sources include a meteorological data source. Moreover, the grid-control server is further configured to: receive meteorologi-cal data from an external server hosting the meteorological data; and identify one or more energy storage appliances associated with a weather event at a forecasted time as indicated by the meteorological data, based upon the geo-graphic data for each of the one or more energy storage appliances. The grid-control server determines the energy requirement for the one or more energy storage appliances associated with the weather event responsive to the grid-control server identifying the one or more energy storage appliances. The grid-control server further transmits to the vehicle computing device the instruction to discharge the amount of energy to the one or more energy storage appli-ances associated with the weather event in accordance with the forecasted time.

In some implementations, the grid-control server is fur-ther configured to receive the energy requirement from an end-consumer computer via the nano-grid controller. The energy requirement includes a request for the amount of energy for the nano-grid.

In some implementations, the grid-control server is fur-ther configured to determine a route for a vehicle associated with the vehicle computing device based upon the geo-graphic data for one or more nano-grids and meteorological data received from the one or more data sources.

In some embodiments, a computer-implemented method for controlling mobile energy grid subsystems in which the method comprises receiving from one or more data sources, by a grid-control server executing grid controller software, energy data associated with a plurality of client computing devices in communication with the grid-control server; determining, by the grid-control server, an energy require-ment including an amount of energy for a nano-grid based upon the energy data for the nano-grid received from the one or more data sources; and transmitting, by the grid-control server, to a vehicle computing device of the plurality of computing devices an instruction to discharge the amount of energy to a nano-grid storage appliance of the nano-grid and geographic data for the nano-grid.

In some implementations, the method further comprises receiving, by the grid-control server, an indication from the nano-grid controller that the nano-grid storage appliance has received the amount of energy of the energy requirement; and updating, by the grid-control server, a database to indicate the amount of energy dis-charged to the nano-grid.

In some implementations, the method further comprises determining, by the grid-control server, an energy surplus including a surplus amount of energy for a second nano-grid based upon the energy data received from the one or more data sources; and transmitting, by the grid-control server, to the vehicle computing device a second instruction to charge, from a second nano-grid storage appliance of the second nano-grid, the sur-plus amount of energy.

In some implementations, the plurality of client comput-ing devices in communication with the grid-control server further includes an energy supply server coupled to a central energy storage station. Moreover, the method further com-prises: receiving, by the grid-control server, the energy data associated with the central energy storage station from the energy supply server; and updating, by the grid-control server, a database to include a centralized amount of energy at one or more central energy storage stations.

In some implementations, the method further comprises transmitting, by the grid-control server, to the vehicle com-puting device a second instruction to charge from the central energy storage station the amount of energy of the energy requirement.

In some implementations, the grid-control server receives from the vehicle computing device a state of charge of a vehicle storage device in the energy data, and instructs the vehicle computing device to charge or discharge energy for the vehicle storage device.

In some implementations, the method further comprises receiving, by the grid-control server, the energy requirement from the nano-grid controller, the energy requirement including a request for the amount of energy for the nano-grid.

In some implementations, the method further comprises determining, by the grid-control server, a route for the vehicle computing device based upon the geographic data for one or more nano-grids and meteorological data received from the one or more data sources.

In some embodiments, a system comprises a grid-control server and a plurality of nano-grids. The grid-control server is configured to execute software programming of a grid controller and the grid-control server is in communication with a plurality of client computing devices, including a plurality of nano-grid computing devices. Each nano-grid includes a nano-grid storage appliance configured to store electricity for the nano-grid and a nano-grid computing device comprising a processor configured to execute software programming of a nano-grid controller. When the nano-grid controller is executed by the nano-grid computing device, the nano-grid computing device is configured to: transmit energy data associated with the nano-grid to the grid-control server; update the energy data associated with the non-grid to include an additional amount energy, responsive to the nano-grid storage appliance receiving from a vehicle storage appliance an electric charge of the additional amount of energy corresponding to the energy data; and transmit to the grid-control server an indication that the nano-grid storage appli-ance has received the amount of energy from the vehicle storage appliance.

In some implementations, the nano-grid controller is further configured to determine an energy requirement for the nano-grid based upon the energy data. The energy data includes a consumption rate and a current state of charge of the nano-grid storage appliance. The energy data transmitted to the grid-control server includes a request for the energy requirement.

In some implementations, the nano-grid controller is configured to: determine an energy surplus for the nano-grid based upon the energy data for the nano-grid, wherein the energy data includes a consumption rate and a state of charge of the nano-grid storage appliance; and receive from the grid-control server an instruction to discharge the energy surplus to the vehicle storage appliance.

In some implementations, the system further comprises a nano-grid energy generator configured to generate additional energy and store the additional energy into the nano-grid storage appliance. The nano-grid controller is further configured to: update the energy data for the nano-grid according to the additional energy, responsive to detecting the additional energy in the nano-grid storage appliance; and transmit the energy data indicating the additional energy to the grid-control server.

The terminology used herein can imply direct or indirect, full or partial, temporary or permanent, action or inaction. For example, when an element is referred to as being "on," "connected" or "coupled" to another element, then the element can be directly on, connected or coupled to the other element and/or intervening elements can be present, including indirect and/or direct variants. In contrast, when an element is referred to as being "directly connected" or "directly coupled" to another element, there are no intervening elements present. Moreover, the terminology used herein is for describing particular example embodiments and is not intended to be necessarily limiting of the present disclosure. As used herein, the singular forms "a," "an" and "the" are intended to include the plural forms as well, unless the context clearly indicates otherwise. Also, as used herein, the term "a" and/or "an" shall mean "one or more," even though the phrase "one or more" is also used herein. The terms "comprises," "includes" and/or "comprising," "including" when used in this specification, specify the presence of stated features, integers, steps, operations, elements, and/or components, but do not preclude the presence and/or addition of one or more other features, integers, steps, operations, elements, components, and/or groups thereof. Furthermore, when the present disclosure states herein that something is "based on" something else, then such statement refers to a basis which may be based on one or more other things as well. In other words, unless expressly indicated otherwise, as used herein "based on" inclusively means "based at least in part on" or "based at least partially on."

As used herein, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

Unless otherwise defined, all terms (including technical and scientific terms) used herein have the same meaning as commonly understood by one of ordinary skill in the art to which this disclosure belongs. The terms, such as those defined in commonly used dictionaries, should be interpreted as having a meaning that is consistent with their meaning in the context of the relevant art and should not be interpreted in an idealized and/or overly formal sense unless expressly so defined herein.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Features or functionality described with respect to certain example embodiments may be combined and sub-combined in and/or with various other example embodiments. Also, different aspects and/or elements of example embodiments, as disclosed herein, may be combined and sub-combined in a similar manner as well. Further, some example embodiments, whether individually and/or collectively, may be components of a larger system, wherein other procedures may take precedence over and/or otherwise modify their application. Additionally, a number of steps may be required before, after, and/or concurrently with example embodiments, as disclosed herein. Note that any and/or all methods and/or processes, at least as disclosed herein, can be at least partially performed via at least one entity or actor in any manner. Although certain embodiments have been depicted and described in detail herein, it will be apparent to those skilled in the relevant art that various modifications, additions, substitutions, and the like can be made without departing from the spirit of the disclosure, and these are, therefore, considered to be within the scope of the disclosure, as defined in the following claims.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc. The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A system comprising:
a plurality of nano-grids, each nano-grid being air-gapped from any energy storage station for charging or discharging at least one stored energy vehicle (SEV), each SEV having a vehicle computing device and a vehicle storage device for storing an electrical energy payload, and including a nano-grid storage appliance configured to store electricity for the nano-grid discharged from the electrical energy payload of the SEV and a nano-grid computing device comprising a processor configured to execute software programming of a nano-grid controller; and
a grid-control server in communication with a plurality of client computing devices including each nano-grid computing device and configured to execute software programming of a grid controller, wherein the grid controller, when executed by the grid-control server, is configured to:
receive, from one or more data sources, energy data associated with the plurality of client computing devices in communication with the grid-control server;
determine an energy requirement including an amount of energy for the nano-grid based upon the energy data received from the one or more data sources;
generate an SEV schedule of one or more SEVs for the plurality of nano-grids indicating the amount of energy of the energy requirement of each particular nano-grid; and
transmit to the vehicle computing device of an SEV an instruction to discharge the amount of energy to the nano-grid storage appliance and geographic data for the nano-grid.

2. The system according to claim 1, wherein the grid-control server is further configured to:
receive an indication from the nano-grid controller that the nano-grid storage appliance has received the amount of energy of the energy requirement; and
update a database to indicate the amount of energy discharged to the nano-grid.

3. The system according to claim 1, wherein the grid-control server is further configured to:
determine an energy surplus including a surplus amount of energy for a second nano-grid based upon the energy data received from the one or more data sources; and
transmit to the vehicle computing device a second instruction to charge, from a second nano-grid storage appliance of the second nano-grid, the surplus amount of energy.

4. The system according to claim 1, wherein the plurality of client computing devices in communication with the grid-control server further includes an energy supply server coupled to a central energy storage station, and
wherein the grid-control server is further configured to:
receive the energy data associated with the central energy storage station from the energy supply server; and update a database to include a centralized amount of energy at one or more central energy storage stations.

5. The system according to claim 4, wherein the one or more data sources includes a source of meteorological data, and wherein the grid-control server is further configured to:
   receive meteorological data from an external server hosting the meteorological data;
   and identify one or more energy storage appliances associated with a weather event at a forecasted time as indicated by the meteorological data, based upon the geographic data for each of the one or more energy storage appliances, wherein the grid-control server determines the energy requirement for the one or more energy storage appliances associated with the weather event responsive to the grid-control server identifying the one or more energy storage appliances, and
   wherein the grid-control server transmits to the vehicle computing device the instruction to discharge the amount of energy to the one or more energy storage appliances associated with the weather event in accordance with the forecasted time.

6. The system according to claim 1, wherein the vehicle computing device is configured to:
   monitor a state of charge of the vehicle storage device; and
   instruct the vehicle storage device to charge or discharge a predetermined amount of energy at one or more nano-grids of the plurality of nano-grids, wherein an amount of voltage for the predetermined amount of energy is not increased for delivery to each geographic location of the one or more nano-grids.

7. The system according to claim 1, wherein the grid-control server is further configured to:
   receive the energy requirement from an end-consumer computer via the nano-grid controller, wherein the energy requirement includes a request for the amount of energy for the nano-grid.

8. The system according to claim 1, wherein the grid-control server is further configured to:
   determine a route for the SEV associated with the vehicle computing device based upon the geographic data for one or more nano-grids and meteorological data received from the one or more data sources.

9. A computer-implemented method for controlling mobile energy grid subsystems, the method comprising:
   receiving from one or more data sources, by a grid-control server executing grid controller software, energy data associated with a plurality of nano-grids, each nano-grid being air gapped from any energy storage station for charging or discharging at least one stored energy vehicle (SEV), each SEV having a vehicle computing device and a vehicle storage device for storing an electrical energy payload, and a plurality of client computing devices in communication with the grid-control server;
   determining, by the grid-control server, an energy requirement including an amount of energy for a nano-grid based upon the energy data for the nano-grid received from the one or more data sources;
   generating, by the grid-control server, an SEV schedule of one or more SEVs for the plurality of nano-grids indicating the amount of energy of the energy requirement of each particular air-gapped nano-grid; and
   transmitting, by the grid-control server, to the vehicle computing device of an SEV an instruction to discharge the amount of energy to a nano-grid storage appliance of the nano-grid and geographic data for the nano-grid, the nano-grid storage appliance configured to store electricity for the nano-grid discharged from the electrical energy payload of the SEV.

10. The method according to claim 9, further comprising:
   receiving, by the grid-control server, an indication from the nano-grid controller that the nano-grid storage appliance has received the amount of energy of the energy requirement;
   and updating, by the grid-control server, a database to indicate the amount of energy discharged to the nano-grid.

11. The method according to claim 9, further comprising:
   determining, by the grid-control server, an energy surplus including a surplus amount of energy for a second nano-grid based upon the energy data received from the one or more data sources; and
   transmitting, by the grid-control server, to the vehicle computing device a second instruction to charge, from a second nano-grid storage appliance of the second nano-grid, the surplus amount of energy.

12. The method according to claim 9, wherein the plurality of client computing devices in communication with the grid-control server further includes an energy supply server coupled to a central energy storage station, and wherein the method further comprises:
   receiving, by the grid-control server, the energy data associated with the central energy storage station from the energy supply server; and
   updating, by the grid-control server, a database to include a centralized amount of energy at one or more central energy storage stations.

13. The method according to claim 12, further comprising transmitting, by the grid-control server, to the vehicle computing device a second instruction to charge from the central energy storage station the amount of energy of the energy requirement.

14. The method according to claim 9, wherein the grid-control server receives from the vehicle computing device a state of charge of the vehicle storage device in the energy data, and instructs the vehicle computing device to charge or discharge energy for the vehicle storage device.

15. The method according to claim 9, further comprising receiving, by the grid-control server, the energy requirement from the nano-grid controller, the energy requirement including a request for the amount of energy for the nano-grid.

16. The method according to claim 9, further comprising determining, by the grid-control server, a route for the vehicle computing device based upon the geographic data for one or more nano-grids and meteorological data received from the one or more data sources.

17. A system comprising:
   a grid-control server configured to execute software programming of a grid controller and in communication with a plurality of client computing devices, including a plurality of nano-grid computing devices; and
   a plurality of nano-grids, each nano-grid being air-gapped from any energy storage station for charging at least one stored energy vehicle (SEV), each SEV having a vehicle computing device and a vehicle storage device for storing an electrical energy payload, and including a nano-grid storage appliance configured to store electricity for the nano-grid discharged from the electrical energy payload of the SEV and a nano-grid computing device comprising a processor configured to execute software programming of a nano-grid controller, wherein the nano-grid controller when executed by the nano-grid computing device is configured to:

transmit a scheduling request for an SEV, the scheduling request containing energy data indicating an energy requirement associated with the nano-grid to the grid-control server;

update the energy data associated with the nano-grid to include an additional amount energy, responsive to the nano-grid storage appliance receiving from a vehicle storage appliance of the SEV an electric charge of the additional amount of energy corresponding to the energy data according to an SEV schedule from the grid-control server for the at least one SEV including the SEV; and transmit to the grid-control server an indication that the nano-grid storage appliance has received the amount of energy from the vehicle storage appliance.

18. The system according to claim 17, wherein the nano-grid controller is further configured to determine an energy requirement for the nano-grid based upon the energy data, wherein the energy data includes a consumption rate and a current state of charge of the nano-grid storage appliance, and wherein the energy data transmitted to the grid-control server includes a request for the energy requirement.

19. The system according to claim 17, wherein the nano-grid controller is configured to:

determine an energy surplus for the nano-grid based upon the energy data for the nano-grid, wherein the energy data includes a consumption rate and a state of charge of the nano-grid storage appliance; and receive from the grid-control server an instruction to discharge the energy surplus to the vehicle storage appliance.

20. The system according to claim 17, further comprising a nano-grid energy generator configured to generate additional energy and store the additional energy into the nano-grid storage appliance, wherein the nano-grid controller is configured to:

update the energy data for the nano-grid according to the additional energy, responsive to detecting the additional energy in the nano-grid storage appliance; and transmit the energy data indicating the additional energy to the grid-control server.

* * * * *